US007249436B2

United States Patent

Ravenelle et al.

(10) Patent No.: US 7,249,436 B2

(45) Date of Patent: Jul. 31, 2007

(54) ELECTRIC SHOCK BIRD AND ANIMAL DETERRENT

(75) Inventors: Mark Ravenelle, Merrimack, NH (US); Laurent Ouellette, Nashua, NH (US)

(73) Assignee: KABA Corporation, Merrimack, NH (US)

( * ) Notice: Subject to any disclaimer, the term of this patent is extended or adjusted under 35 U.S.C. 154(b) by 0 days.

(21) Appl. No.: 11/401,706

(22) Filed: Apr. 11, 2006

(65) Prior Publication Data

US 2006/0232370 A1 Oct. 19, 2006

Related U.S. Application Data

(60) Provisional application No. 60/671,818, filed on Apr. 15, 2005, provisional application No. 60/726,119, filed on Oct. 13, 2005.

(51) Int. Cl.
*A01M 19/00* (2006.01)

(52) U.S. Cl. ........................................ 43/98; 336/200

(58) Field of Classification Search .................... 43/98
See application file for complete search history.

(56) References Cited

U.S. PATENT DOCUMENTS

| | | | | |
|---|---|---|---|---|
| 3,294,893 | A | 12/1966 | Shaffer | |
| 3,366,854 | A | 1/1968 | Robinson | |
| 3,717,802 | A * | 2/1973 | Plevy et al. | 361/232 |
| 4,841,914 | A | 6/1989 | Chatten | |
| 4,862,637 | A | 9/1989 | Dressel | |
| 5,163,658 | A | 11/1992 | Cleveland | |
| 5,850,808 | A | 12/1998 | Burdick | |
| 6,006,698 | A | 12/1999 | Negre | |
| 6,283,064 | B1 | 9/2001 | Djukastein et al. | |
| 6,718,701 | B2 | 4/2004 | Riddell | |
| 6,933,446 | B1 | 8/2005 | Waldorf et al. | |
| 2005/0132635 | A1 * | 6/2005 | Riddell | 43/98 |

FOREIGN PATENT DOCUMENTS

| | | | |
|---|---|---|---|
| CA | 2127953 | | 7/1994 |
| CH | 643 111 | A5 | 5/1984 |
| EP | 0 860 116 | A1 | 8/1998 |
| GB | 2 096 873 | A | 10/1982 |
| GB | 2 391 787 | A | 2/2004 |
| JP | 2000041564 | | 2/2000 |
| JP | 2000050786 | | 2/2000 |
| JP | 200145953 | | 2/2001 |

(Continued)

OTHER PUBLICATIONS

Zareba Systems, “Zareba A15”, [online] [retrieved on Oct. 3, 2005] Retrieved from the internet <URL://www.zarebasystems.com/products/product details.aspx?id=259>, 1 page.

(Continued)

*Primary Examiner*—Elvin Enad
*Assistant Examiner*—Joselito S. Baisa
(74) *Attorney, Agent, or Firm*—Maine & Asmus

(57) ABSTRACT

An animal and bird deterrent apparatus is disclosed. The apparatus includes a flexible dielectric material, and electrically conducting strips disposed on a top surface of the flexible material. In one embodiment the flexible material is secured to a structure by an adhesive and the strips are coupled to a high voltage source such that a shock is provided.

20 Claims, 11 Drawing Sheets

FOREIGN PATENT DOCUMENTS

| | | |
|---|---|---|
| JP | 2004076549 | 3/2004 |
| WO | 0018224 | 4/2000 |
| WO | 2004014125 A2 | 2/2004 |

OTHER PUBLICATIONS

Uline Shipping Supply Specialists, “3M 4910 VHB Acrylic Foam Tape”, [online] [retrieved on Oct. 12, 2005] Retrieved from the internet <URL://www.uline.com/browse_listing_6038.asp>, 1 page.

Wirop Industrial Co., Ltd., “Duplex Aluminum Ferrule”, [online] [retrieved on Apr. 10, 2005] Retrieved from the internet <URL://www.wirop.com.tw/p5-11.htm>, 1 page.

“2004 Product Catalogue”, Bird B Gone Inc., 2004, pp. 1-8.

“Bird Barrier The World’s Best Bird Deterrent Products”, Bird Barrier America, Inc., pp. 1-4.

“BirdFence”, [online] [retrieved on Apr. 12, 2005] Retrieved from the internet <URL://www.birdbusters.com/bird_control_electric_fence.html>, pp. 1-2.

“Structural Bird Control Products”, [online] [retrieved on Apr. 12, 2005] Retrieved from the internet <URL://www.birdbusters.com/bird_control_products.html>, pp. 1-4.

“Birdshock”, [online] [retrieved on Apr. 12, 2005] Retrieved from the internet <URL://www.birdbusters.com/bird_control_electric_track.html>, pp. 1-2.

“Spring 2004 Products”, [online] [retrieved on Apr. 12, 2005] Retrieved from the internet <URL://www.hotfoot.com/products.html>, HotFoot Bird Repellents, pp. 1-4.

“New Electrack A.S.™ Bird Shock”, [online ] [retrieved on Apr. 12, 2005] Retrieved from the internet <URL://www.hotfoot.com/elec-pd.html>, HotFoot Bird Repellents, pp. 1-4.

“Bird-Shock® Flex-Track™”, Bird Barrier America, Inc.,2003, pp. 1-4.

“Bird-Shock® Flex-Track™ Features”, Bird Barrier America, Inc., pp. 1-2.

* cited by examiner

ELECTRIC SHOCK BIRD AND ANIMAL DETERRENT

RELATED APPLICATIONS

This application claims the benefit of U.S. Provisional Application Nos. 60/671,818, filed Apr. 15, 2005, and 60/726,119 filed Oct. 13, 2005 and both are herein incorporated in their entirety by reference.

FIELD OF THE INVENTION

The present invention relates to animal control, and more particularly, to an apparatus that repels birds and animals by electrical shock.

BACKGROUND OF THE INVENTION

As man and wildlife strive to peaceably coexist, there continues to be some tension. One example is the proliferation of birds in cities and urban areas. The birds tend to congregate on any structure with enough space for a flock to sit. An ideal structure is one that provides birds the ability to scan that area for predators as well as feeding opportunities. The best structures are also used for nesting or have nest sites nearby. These perches are typically used daily by the birds and create a nuisance and health hazard.

The birds, such as pigeons, have a high disease potential when permitted to roost in areas frequented by humans. For example, pigeons roosting and nesting on roofs, around air conditioning systems, and in steeples create a serious health concern. There are over forty known virus and sixty diseases directly associated with birds and their droppings. These diseases vary in seriousness from minor stomach ailments to fatal diseases. Some of the known diseases and problems associated with birds include Histoplasmosis, Candidiasis, Cryptococcosis, St. Louis Encephalitis, Salmonellosis, West Nile Virus, and Eastern equine encephalitis (EEE). It is estimated that in America alone, approximately 500,000 people test positive each year and there are an estimated 800 annual deaths related to birds. In addition, bird roosts are frequently infested with flies as well as several species of parasites such as bird mites, and ticks that can further transmit disease.

Bird roosts also typically smell and the odor can drift to high traffic areas and cause economic harm to businesses and restaurants. The bird droppings include uric acid which is a very powerful acid that can damage the finish on an automobile. The presence of accumulated bird droppings can block gutters and drains and the acidity in bird droppings may cause permanent damage to metal and painted surfaces. Wet bird droppings are also slippery and can lead to slipping and falling of persons when walking.

The birds can also detract from various public exhibits such as statues, park benches, and playground items and diminish the recreational experience. In addition, these structures and others such as parking garages, building surfaces and billboards require regular cleaning and incur considerable expense.

With respect to billboards, the advertiser spends considerable sums of money for displaying the various goods and services for public viewing. Birds and related pests can ruin the advertising capabilities and cost advertisers money.

Many bird deterrent products have been developed over the past few decades with the intention of solving bird problems. For illustrative purposes, the billboard structure is likely the most visible example of a bird problem that requires a solution. It also is one of the most difficult to solve because of the location and structure of the billboard and the aesthetic requirements. Several million billboards exist in America alone and the worldwide estimates are significantly higher. Many of these billboards are host to the offensive bird problems.

With respect to billboards, the birds perch all over the billboard structure. Horizontal catwalks, railings, angle iron, girders and pipes are also being perched upon and form a comfortable environment for the birds. The irregularity of the shapes these structures pose is an almost impossible challenge for bird deterrent mechanisms.

There have been numerous attempts to eliminate or alleviate the problems associated with bird occupying an area and creating a messy and unhealthy environment.

Some products like bird spikes and sticky gels pose hazards to billboard workers and thus are not a practical solution for those areas that regularly require human traffic. Other systems have experimented with noise products and even 'fake' birds of prey.

Other systems involve the use of high voltage low current electricity. Static level shocks occur when conductive materials, such as a bird foot, bridges across two wires thereby completing a circuit. Brief pulses are superior in their affect on unwanted pests as the pests quickly learn to fear the area. Although there are also several forms of electric shock track designs, these designs are typically rigid and cannot easily conform to the angles and bends required for placement on a structure. The profiles or thickness of many of the existing bird deterrent track structures are significant and represent trip hazards. The tracks are thick enough so that they can be easily seen on a horizontal plane, and these devices do not have the ability to economically change color, pattern or be translucent therefore detracting from the aesthetics.

What are needed, therefore, are viable and practical alternatives to keep birds and animals away from certain structures. The system should be easy to install and allow an easy way to 'splice' or otherwise couple sections together to place the system in the proper locations regardless of the structure shape or design.

SUMMARY OF THE INVENTIONS

Accordingly, one embodiment of the present invention is to provide an improved device for repelling birds and animals from various structures.

One embodiment of the invention is a tape for deterring birds and animals, comprising a flexible elongate base material having a top surface and a bottom surface with an intermediary layer securely disposed on the top surface of the base material. There are at least two conducting strips securely disposed on the intermediary layer, wherein the strips are separated by a gap to avoid arcing between the strips, and wherein each of the conducting strips has a side margin to avoid arcing between the conducting strips and a structure upon which the apparatus is installed. A film material disposed on the intermediary layer about the conducting strips such that the conducting strips are not covered by the film material. This is typically a center portion of the tape between the conducting strips. The base material in combination with the intermediary layer typically has a dielectric property sufficient to insulate the conducting strips from a structure upon which the tape is installed. The dielectric property can vary depending upon the installation.

Further embodiments include at least one of the following variations. The film material may be between the conducting strips and have characteristics selected from at least one of the group consisting of colored, clear, shaded, patterns, and textual messages. The base material may be selected from the group consisting of colored, transparent, translucent and clear. The base material may include a neoprene base. The film material may be acrylic based. The side margin may be at least about 0.5 inches. The gap between the conducting strips may be not less than about 0.5 inches according to one of the embodiments. In another embodiment pertaining to animal fencing, the gap between the conducting strips may be not less than about 1.250 inch. The conducting strips may be disposed on the intermediary layer in a pattern so as to increase the total surface area covered by the strips, thereby increasing the likelihood of the strips being bridged by animals intended to be shocked. The film material and the conducting strips may be about approximately flush above the intermediary layer. The strips may be selected from the group consisting of solid electrically conductive metals, stranded electrically conductive metals and braided electrically conductive metals. The bottom surface of the base material may be single sided adhesive coated or double sided adhesive coated, including all forms of pressure sensitive tapes, wherein the outer adhesive surfaces can be covered with a removable non-adhesive member.

According to one of the embodiments, the strips are operatively coupled to a high voltage source. The number of strips can be at least two, and the strips are typically disposed and coupled to the high voltage source such that any two of the strips can cause an electrical shock. The strips may be coupled to the high voltage source through wires, wherein the strips and the wires are spliced and secured with an electrical connector.

In a further embodiment, the tape has a base material that is a magnetic tape, whereby the tape can be affixed to a ferrous metal surface of the structure.

Yet a further embodiment of the present invention is a system for deterring birds and animals, comprising a flexible pad of a dielectric material, a pair of conductive strips disposed upon a surface of the pad, wherein the pair of strips overlap each other but are electrically isolated from each other. A high voltage source is operatively coupled to the conductive strips. The strips may be disposed in a pattern such as a grid. The overlapping strips may be electrically isolated from each other by high dielectric sections.

According to another embodiment, the present invention is a method for installing an animal tape deterrent on a structure, comprising preparing a surface of the structure, installing the tape on the prepared surface of the structure, wherein the tape comprises a flexible elongate base material having a top surface and a bottom surface, and at least two conducting strips disposed on the base material, electrically coupling between at least two sections of tape wherein the conducting strips are coupled with at least one electrical connector, and coupling the strips of the tape to a high voltage source. The electrical connector may be a ferrule, and the method may further comprise peeling back a section of each of the conducting strips from the base material, placing a ferrule around each section, and crimping the ferrule. The method may also include flipping one section of the tape around itself such that the section changes a direction of the tape without using electrical connectors.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1B:
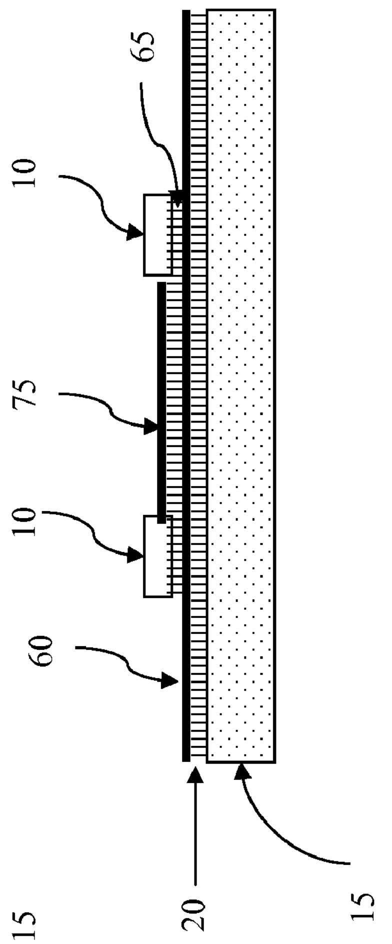
FIG. 1*b* is a cross sectional perspective view of the tape configured in accordance with one embodiment of the present invention.
Figure 1A:
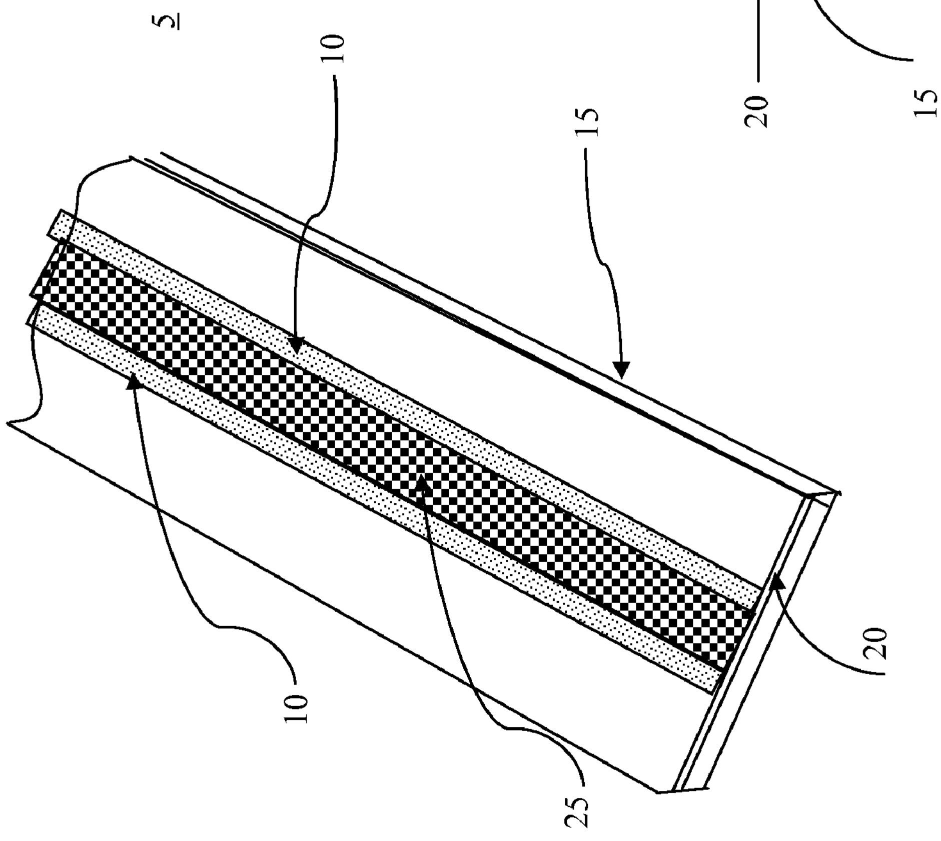
FIG. 1*a* is a top perspective view of the tape configured in accordance with one embodiment of the present invention.

Referring to FIG. 1*a* and FIG. 1*b*, the top perspective view and cross section view illustrates the general layout and design of a section of a bird deterrent shock tape 5 in accordance with one embodiment of the present invention. In general terms, the tape 5 is a thin composite lamination of particularly desirable durability and laminated in a fashion such that it will not be delaminated under adverse weather, temperature conditions or age, and can withstand hundreds of pounds of shear force. On a top surface of the tape 5 are electrically conductive strips 10 that are oriented to optimize the likelihood of shocking a bird or animal that strays upon the tape 5 and provides a conducting path. The tape 5 is a flexible lamination or composite that can be secured to odd-shaped structures, such as billboard frames and letters. Because of the nature of the tape 5, the layers allows for dissimilar materials or lamination layers having differing expansion rates, in order to absorb thermal stresses.

The tape 5 is constructed in such a manner that the conductors 10 are spaced appropriately so that the feet of the birds bridge both conductors 10. The present invention can come in different variations such that the width between the conductors 10 vary depending upon the type of bird or pest being deterred. In one of the embodiments, the birds land or walk upon the tape 5 and their feet are proximate to each of the conducting strips 10 that carry a DC hi-voltage/low current signal that delivers a brief and relatively harmless pulse to the bird. This high voltage shock causes the bird enough discomfort so that it will not want to return to the area.

Referring again to FIGS. 1*a* and 1*b*, the tape base 15 can be a flexible non-conductive material that could be colored, transparent, translucent or clear. The tape base 15 could be made of rubber, plastic or other electrically non-conductive materials, and in one embodiment is neoprene. The base layer 15 should be relatively thin so as not to present a trip hazard to pedestrians or workers and to maintain a low visual profile for aesthetic demands by customers. However, the tape base 15 also must be of sufficient thickness so as to withstand crushing forces from foot traffic on billboard catwalks and other areas without adverse effect. The flexible nature of the tape base 15 allows it to conform to edges, corners, flat and round surfaces such as those found on billboard structures while still providing the required structural strength for the base and having sufficient dielectric rating.

With respect to the surface upon which the tape 5 is installed, a conducting surface such as conductive metal surfaces can include aluminum, copper, tin and steels. When bonding to conductive metals, insulating patches or other dielectric insulating materials may be placed under any location where the strips 10 are in direct contact with conducting surfaces or other strips.

In certain embodiments the tape base 15 should also have sufficient dielectric properties to properly insulate the high voltage conducting strips 10 from the conductive structure upon which it is installed. The dielectric properties of the tape 5 help to establish the approximate thickness requirements and dimensions of the tape 5. The surface upon which the tape 5 is disposed may be an electrically grounded metal or conductive material, so the tape base 15 should have adequate dielectric strength for the anticipated voltage either by itself or in combination with the intermediate layer(s) 20 and the film material or cover 25. In applications wherein the tape is secured to non-conductive materials, the dielectric properties of the tape 5 are not a concern and therefore the thickness is not necessarily related to the dielectric properties.

The dielectric properties of the tape 5 can be approximated by adding the dielectric strength of the individual layers. For example, the dielectric strength of the pressure sensitive adhesive tape is about 0.040×400 V/mil=16 kV. The film has dielectric properties of about 0.005×380 V/mil=1.9 kV. Thus the total is about 17.9 kV.

As another illustration, the dielectric strength of the neoprene base layer is about 0.031 thickness×600V/mil=18.6 kV. The film has a dielectric strength of about 0.005×380V/mil=1.9 kV. The dielectric strength of the adhesive layers is considered minimal, thus the total dielectric strength of this tape is about 20.5 kV.

As noted, the film or tape must have sufficient dielectric strength to accommodate the high voltage required to be an effective deterrent. Table A illustrates the dielectric strengths of various materials.

TABLE A

Chart of dielectric strength of materials (V/mil)

| Common Materials | Dielectric Strength (V/mil) |
|---|---|
| Mylar | 7000 |
| Enamel | 450 |
| ABS | 410 |
| Delrin | 500 |
| Lexan | 400 |
| Nylon | 400 |
| Paper | 200 |
| Plexiglass | 450–990 |
| Polyethylene LDPE/HDPE | 450–1200 |
| Polypropylene | 500 |
| Polystyrene | 500 |
| PVC | 725 |
| Rubber | 150–500 |
| Silicone RTV | 550 |
| Teflon | 1000 |
| Water (68° F.) | 80 |

The maximum voltage (including derating) for a particular material can be calculated as follows:

$$
\begin{aligned}
&3M\ F\text{-}9469PC \quad 3{,}500\text{ Volts} = 3{,}500\text{ Volts}\\
&\text{Neoprene} \quad 600\ V/\text{mil} = 18{,}000\text{ Volts}(.031)\\
&\text{Suggested max. voltage} = \frac{21{,}500\text{ Volts before predictable break down}}{10{,}750\text{ Volt}(1/2\text{ safety factor})}
\end{aligned}
$$

A safety factor of 0.5 is advisable to eliminate arc through potential on the dielectric. This means that for the 1/32" neoprene with a suggested maximum of 10,750 volts before stressing the dielectric. Many, fence energizing power supplies produce voltages under 10 Kv. Other materials may be considered as other possible materials. Clean neoprene (without talc) in one embodiment is 2.0" W×1/32" thick, and has 45-55 durometer.

In certain embodiments the tape base 15 can comprise a pressure sensitive adhesive tape with adequate dielectric insulating properties that will protect the conducting strips 10 from an electrically conductive surface upon which the tape 5 is secured.

The cover 25 can be disposed upon the top surface of the tape 5 and provide protection to the intermediate layer 20 and underlying base 15. The cover or film material 25 can be composed of printed material and may be UV resistant as well as withstand outdoor weather extremes and handling. In one embodiment the cover 25 is made of a durable, no stretch material such as polyolefin, polyester, or acrylic and a non-fading exterior grade ink. The cover can also be electrically non-conductive and not absorb water, while allowing the conductive strips 10 to reside between the cover material or be disposed upon the cover material 25.

The cover 25 can be used for a variety of functions, such as a dust cover for the tape base 15 or the intermediate layer 20. One variation is for the cover 25 to be a clear film that aids in the clarity retention of the tape 5 as a whole when both the tape base 15 and/or the intermediate layer 20 are also clear. The appearance of the cover 25 is easily adaptable to a wide variety of designs, patterns, colors, translucent, multiple languages or promotional covers 25. These cosmetic options are sought by many in the industry, and the cover 25 can also be imprinted with cautionary statements and warning as to the high voltage conditions associated with the strips 10.

In one embodiment, the tape base layer 15 employs an intermediate adhesive layer 20 on one side of the base layer 15 which can be a pressure sensitive transfer adhesive agent such as 3M® 950 adhesive.

The intermediate adhesive layer 20 secures the base 15 to the film 60 and provides the transition for the film 60 adhered to the adhesive layer 20. On the other side of the intermediate adhesive layer 20 is a film 60, wherein the film 60 may be clear, a solid color, and even incorporate a pattern or design. The film 60 is intended as a covering for the adhesive in this embodiment but may also impart favorable characteristics. For example the film 60 may provide additional dielectric properties and can have coloring, patterns or text messages.

On the other side of the film 60 is a second adhesive layer 65, wherein the second adhesive layer 65 can be an adhesive such as 3M® 927/9469. The conducting lines or strips 10 are deployed on the adhesive layer 65, typically about the perimeter of the second adhesive layer 65. A label film 75 between the strips 10 is adhered to the second adhesive layer 65, wherein the label film 75 can be colored, clear, shaded, or include a pattern or design. The label film 75 can also incorporate warnings or other textual messages. The conducting strips 10 and label film 75 are generally intended to substantially cover the second adhesive 65.

In this particular embodiment the base layer 15, the first adhesive layer 20 and the film 60 are about the same width whereas the second adhesive layer 65 has a smaller dimension that extends about the total width of the combined strips 10 and the center label 75. In another embodiment, the second adhesive layer 65 may extend across the entire width of the film 60, wherein side cover films (not shown) would cover the right and left section of the exposed surface of the second adhesive layer 65.

One embodiment uses a neoprene base material bonded to a 100% acrylic film. Another adhesive layer is laid on the top, to which a 100% acrylic film label and aluminum wires are affixed. Quality urethane, polyurethane or polymeric sealants/adhesives may be used for bonding. Materials may be selected to withstand harsh weather, direct UV exposure and immersion. Neoprene, acrylic, adhesives and aluminum are proven to be weather resistant.

Figure 2A:
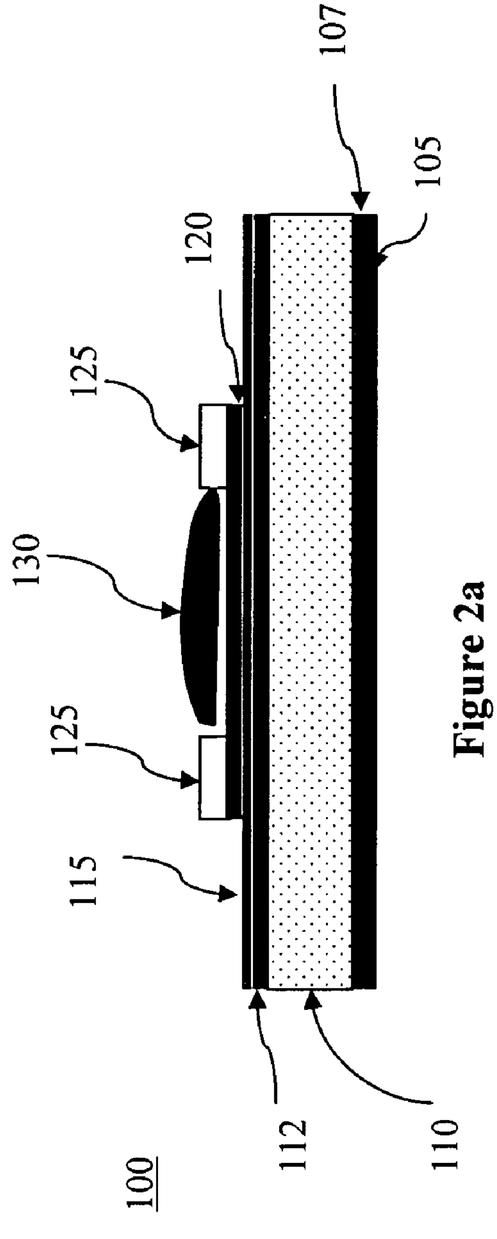
FIG. 2*a* is a cross sectional perspective view of the tape with double sided tape configured in accordance with another embodiment of the present invention.

A further embodiment is a tape 100 as shown in FIG. 2*a*, wherein there is a liner material 105 on the backside on an adhesive transfer tape 110 such as a very high bond (VHB) tape, for example, 3M® 4910 VHB. In this embodiment, the tape base 110 is a double sided adhesive tape so that there is an adhesive layer 107, 112 on both sides of the tape 110. A film 115 is disposed on the other side of the tape 105, wherein the film 115 covers the upper adhesive layer 112 and can be clear or transparent. An adhesive layer 120 is disposed on the clear film 115 which can be an adhesive such as 3M® 927/9469. The conducting metallic strips 125 are disposed on to the adhesive layer 120 and there can be a label or film 130 disposed between the conducting strips 125 thereby covering the adhesive layer 120.

Under certain circumstances, the area between the two conductor strips can be laden with moisture from rain or dew and this may cause arcing from one conducting strip 125 to the other strip 125 through the water. Arcing through moisture can be distracting and reduce the voltage levels throughout the system. It should be noted that when high energy DC pulsing chargers are used, arcing through moisture droplets are more likely to occur than if a low energy DC pulsing charger was used. Mitigating the moisture collecting between conductor strips can be accomplished in a number of ways. According to one embodiment, the film 130 is a flexible strip of material that is placed between the conducting strips 125, wherein the overall height of the film 130 is about equal to or greater than a height of the strips 125. This increased height of the film 130 would keep water from collecting and thereby reduce the likelihood of arcing. The profile of this filler strip or film 130 can be various shapes such as flat, domed/arcuate or even triangular. The shape should not interfere with the birds' ability to touch or rest their foot upon the conductor strips 125. One way to increase the likelihood of having a bird touch both conductors is to taper the center material 130 towards the inner side of both conductor strips 125. The material of the center portion 130 is typically flexible and non-porous, such as but not limited to a thick acrylic film, a neoprene strip, a thickened mass of adhesive covered by acrylic or closed cell extruded foam product, or any combination thereof. The material can be solid or hollow.

As noted, one embodiment employs a self adhering base having a pre-disposed adhesive covered by a protective liner. In such a configuration, the user only needs to pull off the protective liner and press it into place on the desired surface.

In one embodiment the tape base 110 and the film 115 is colored or transparent such that the tape 100 is nearly invisible when installed. The label portion 130 can also be colored or transparent so that the only visible features would be the conducting strips 125. In one embodiment, the film 115 can be colored to match the surface upon which it will be installed such as a customizable tape. In another embodiment the tape can be transparent which allows for an undetectable bird deterrence system and is ideal for channel letter signs, decorative ledges, and any surfaces where a favorable appearance is required. In one embodiment, an acrylic base adhesive material with a removable poly liner is bonded to an acrylic film. Another adhesive layer is laid on the top, to which a clear acrylic film label and aluminum wires are affixed.

Figure 2B:
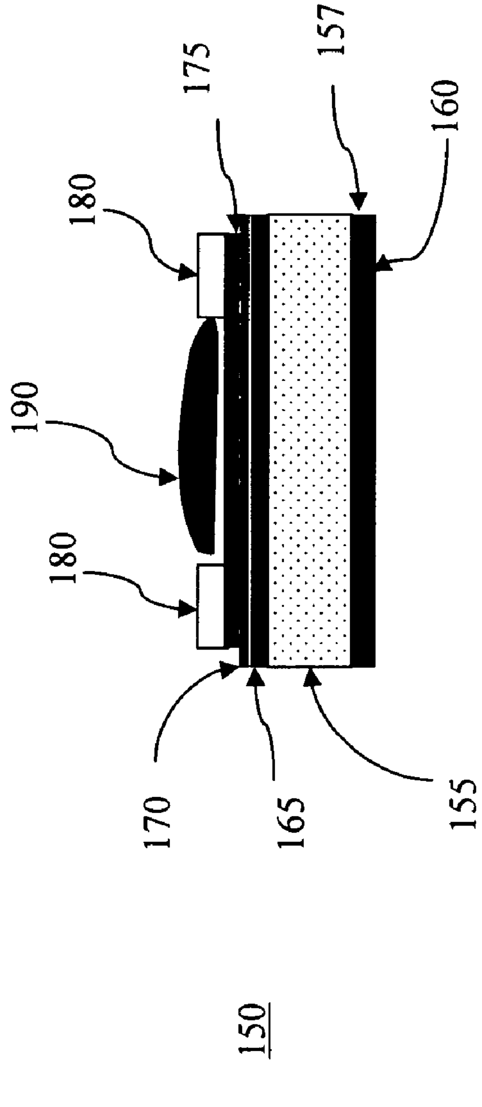
FIG. 2*b* is a cross sectional perspective view of the tape for non-conducting surface configured in accordance with yet a further embodiment of the present invention.

Referring to FIG. 2*b,* another tape embodiment 150 is depicted which is intended for deployment on non-conductive surfaces or environments that do not induce arcing between the conducting strips 180 and the contact surface. In this embodiment, a double-sided adhesive tape base 155 such as the 3M® 4910 VHB is used having a liner 160 on the lower surface. A film 170 is affixed to the upper adhesive surface 165 of the tape base 155. The film 170 can be clear, colored or have any aesthetic design. Deployed on the upper surface of the film 170 is an adhesive layer 175 which can be any suitable adhesive such as 3M® 927 and can be applied as a laminate or in other embodiments as a spray or applied adhesive. On the surface of the adhesive layer 175 are at least two conducting strips 180 located about the edges of the tape 150. On the surface of the adhesive layer 175 in-between the strips 180 can be a label film 190 containing textual messages, warnings or designs.

In this embodiment pertaining to a shock tape 150 on a non-conducting surface, the entire width of the tape 150 can be utilized and the conducting strips 180 can be secured proximate the edges of the tape 150. The non-conducting surfaces such as stone, concrete, marble, and plastic are common bird roosting surfaces such as found on statues, parking garages and building facades.

The width of the tape 150 can represent the optimal distance for producing a shock for the desired nuisance with some consideration of the spacing between the conducting strips 180 and the applied power. Depending upon the power being applied, there needs to be some separation between the conducting strips 180 to avoid shorting between the strips 180. For example, the width for smaller birds may be approximately ¾ inch to 1 inch, while larger birds or other animals may require a wider tape and having conducting strips 180 with a larger separation. However, in this embodiment there is no need to extend the width of the tape to allow a dielectric margin area to avoid arcing. Further non-conductive embodiment are intended for non-conductive surfaces such as stone, marble, cement, limestone, wood, glass and plastic. Alternatively, there could be a non-conductive insulating material applied or disposed between the tape 150 and the surface to be covered.

Figure 2C:
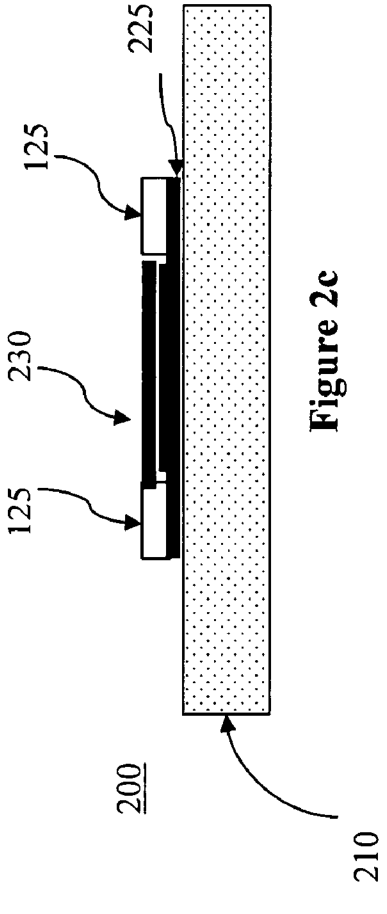
FIG. 2*c* is a cross sectional perspective view of the tape without an intermediate layer configured in accordance with yet a further embodiment of the present invention.

Referring to FIG. 2*c,* a further variation of the tape 200 is shown wherein there is a base material 210 such as neoprene with a layer of adhesive 225 disposed on an upper surface of the base material 210 and disposed only on a center portion of the tape base 200 thereby not requiring an additional film layer. The adhesive 225 can be any suitable adhesive such as 3M® 950. Disposed on the adhesive layer 225 is a film label 230, which can be a solid color or clear. The conducting strips or wires 125 are disposed onto the sections of adhesive such that the conducting strips 125 are oriented approximately parallel to each other along a length of the tape.

FIG. 2*c* also illustrates a further innovation of the present invention that is applicable with all other embodiments, namely having the center portion with the film label 230 at a height that is flush with the height of the conducting strips 125. In order to obtain the proper height, a thicker center film label 230 can be deployed, multiple film labels 230 can be stacked, and/or a thicker section of adhesive 225 can be deployed. There are several advantages to this variation, such as avoiding water from being trapped between the conducting strips 125. Having the center portion flush with the strips 125 may also provide an improved contacting surface for birds as they tend to rest upon raised top surfaces.

A further variation includes wherein there is a liner on the undermost surface with an adhesive material such as 3M® 4910 VHB disposed on a surface of the liner. A clear film is applied to the adhesive material and there is a subsequent section of adhesive such as 3M® 927/9469 applied to a section of the surface of the film with the conducting strips coupled to the section of adhesive.

Figure 2D:
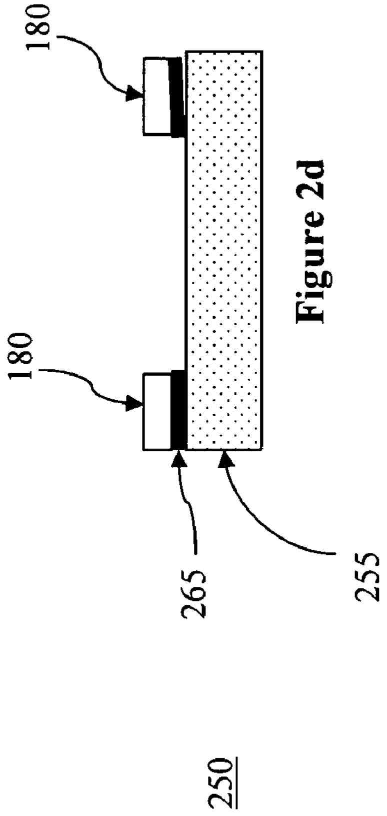
FIG. 2*d* is a cross sectional perspective view of the tape with adhesive only for the conducting strips for non-conducting surfaces configured in accordance with yet a further embodiment of the present invention.

Referring to FIG. 2*d,* a further embodiment of the tape 250 on a non-conducting surface is depicted. In this variation, the adhesive layer 265 is limited to a small section about the same width as the strips 180 such that no label film is required. As noted, the tape base 255 in this embodiment does not need to have dielectric properties and can be thinner and more flexible as well as requiring less material and occupying a smaller region on the contact surface.

The tape 250 is available in many sizes including a 1 inch tape for bonding to non-conductive surfaces such as glass, vinyl, cloth, marble, granite, sandstone, limestone, slate, rubber, concrete, brick and wood. When a non-conductive surface is interrupted by a conductive metal surface (e.g.: a greenhouse with metal skeleton) the installer may use the wider tape having side margins over the conductive metal surface and switch to the narrower tape 250 when running over non-conductive surfaces. The wider tape may extend a minimum of ¾" onto the non-conductive surface.

Figure 2E:
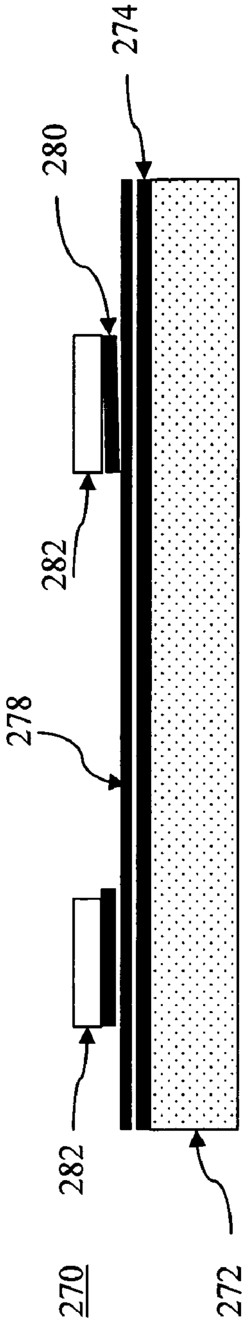
FIG. 2*e* is a cross sectional perspective view of the tape configured in accordance with yet a further embodiment of the present invention for larger animals.

With respect to larger pests and animals, the requirements for the tape are different. For example, one application is for horses and would be installed on the various fencing structures. Referring to FIG. 2*e,* a further tape related to larger animals is depicted. Larger animals would generally require a larger tape as the power requirements would be greater and therefore the composition of the tape and the various spacing requirements would be different. According to one embodiment, the tape 270 is about three inches wide and has a base layer such as neoprene. On the base layer 272 is a first layer of adhesive 274. such as 3M 950 adhesive. Upon the adhesive layer 274 is a film 278 that can be, for example, a colored film. Mounted to the film 274 would be the conducting strips 282, which can be adhered to the film 278 using an adhesive 280 such as 3M 927. As the power requirements are greater for larger animals, the conducting strips, such as aluminum, would be about 0.250 inches wide and separated from each other by about 1.250. In addition, the margin from the edge of the conducting strip to the edge of the tape would be about 0.625 inches to avoid arcing to a conducting surface. It should be understood that if the application was on a non-conducting surface, the margin requirement would not be necessary.

Figure 3A:
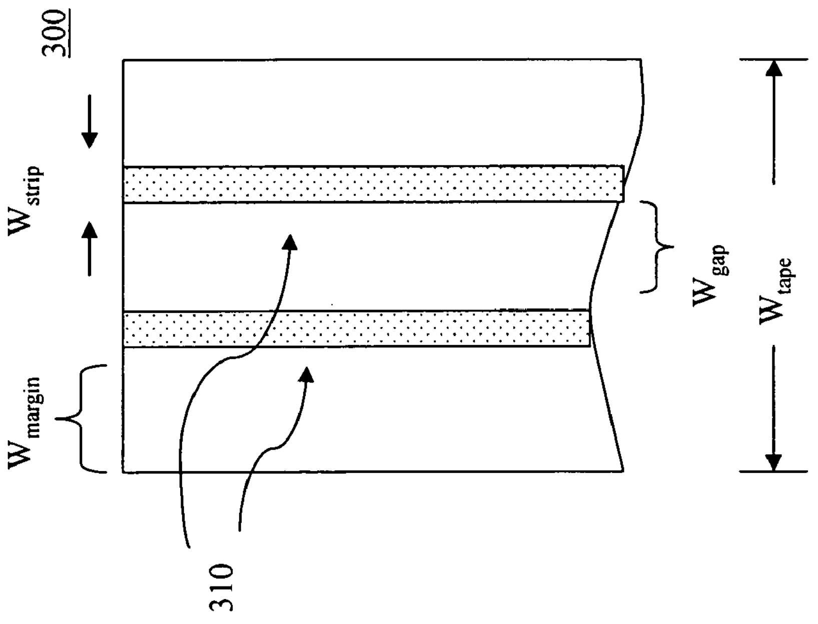
FIG. 3*a* is a top perspective view of the tape showing dimensional layout configured in accordance with an even further embodiment of the present invention.

Referring to FIG. 3*a,* the layout of the tape 300 and the various spacing depends upon certain design factors and the present invention is not limited to any specific dimensions in this regard. For example, the space, $W_{gap}$, between the conducting strips 310 depends upon the intended bird or animal to be shocked as well as requiring some spacing to avoid arcing between the respective strips 310. The width of the conducting strip itself, $W_{strip}$, is generally of sufficient width to handle the electrical requirements and the environmental conditions.

It should be readily appreciated that although the strips 310 are depicted centrally located about a center line of the tape 200 in FIG. 3*a,* in other embodiments the strips 310 can be offset from the centerline and located proximate either side of the tape 300. The installation upon a conducting surface may still require a margin between the strips 310 and the conducting surface unless the surface is treated or a dielectric material is applied to the surface to make it less conducting. One embodiment includes pre-treating the application surface, such as scraping off rust and debris, such that the conductivity is lowered or eliminated thereby allowing a lesser margin as detailed herein.

For illustrative purposes and not to be considered limiting in any fashion, some dimensions for some embodiments are as follows:

Embodiment 1

Conductive Surface $W_{tape}$=2 inches; $W_{wire}$=0.125 inches; $W_{gap}$=0.75 inches; $W_{margins}$=0.5 inches Embodiment 2

Non-Conductive Surface $W_{tape}$=1 inches; $W_{wire}$=0.125 inches; $W_{gap}$=0.75 inches; No $W_{margins}$ Embodiment 3

Figure 3B:
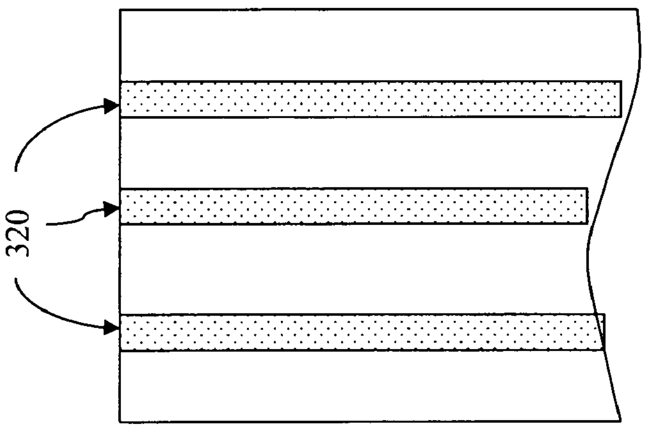
FIG. 3*b* is a top perspective view of the tape depicting multiple conducting strips configured in accordance with an even further embodiment of the present invention.

Large Animals $W_{tape}$=3.0 inches; $W_{wire}$=0.25 inches; $W_{gap}$=1.25 inches; $W_{margins}$=0.625 inches Referring to FIG. 3*b*, there can be more than two conductors 320 such that the spacing between conductors can accommodate multiple bird, animal, and pest types. The multiple conductors 320 would be coupled to the power source (not shown) such that contacting any two strips would cause a shock. For example, with three strips the center strip could be of opposing polarity as compared to the strips on either side of the center strip. It is also possible to switch between electrifying, for example, providing a shock across the center strip and the right hand strip and then switch to electrifying the right hand strip and the left hand strip. A four strip variation would employ two pairs such that each pair would induce a shock and also across the pairs. In this manner, different size and type of pests/animals can be handled from a single tape without having to install a new tape when a new pest type is introduced. As previously described certain large animals require more powerful charges that typically require greater spacing requirements and possibly larger conductors.

Figure 3C:
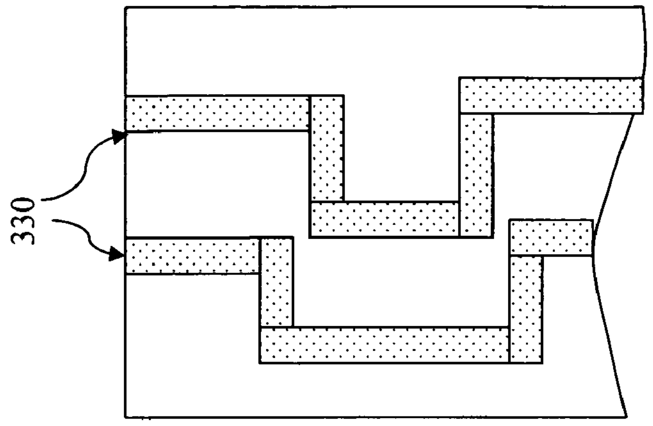
FIG. 3*c* is a top perspective view of the tape depicting a varying conducting strip layout configured in accordance with an even further embodiment of the present invention.

While the strips 310 are depicted as being approximately parallel in FIG. 3*a*, still other embodiments, such as shown in FIG. 3*c*, include having the strips 330 distributed in a pattern across the tape 300 so as to increase the likelihood of having the birds or pests obtaining a shock in certain installations. The size and spacing of the strips 330 can be arranged in many differing manners depending upon the desired result and the margins or spacing from the edge of the strips and between the strips themselves. The strips 330 can also be arranged in numerous other layouts and patterns depending upon the intended requirements, such as disposing the conductors 330 in a sinusoidal or square wave pattern that would increase the total surface area covered by the conductors 330 and may increase the likelihood of shocking the birds or other animals.

Figure 4:
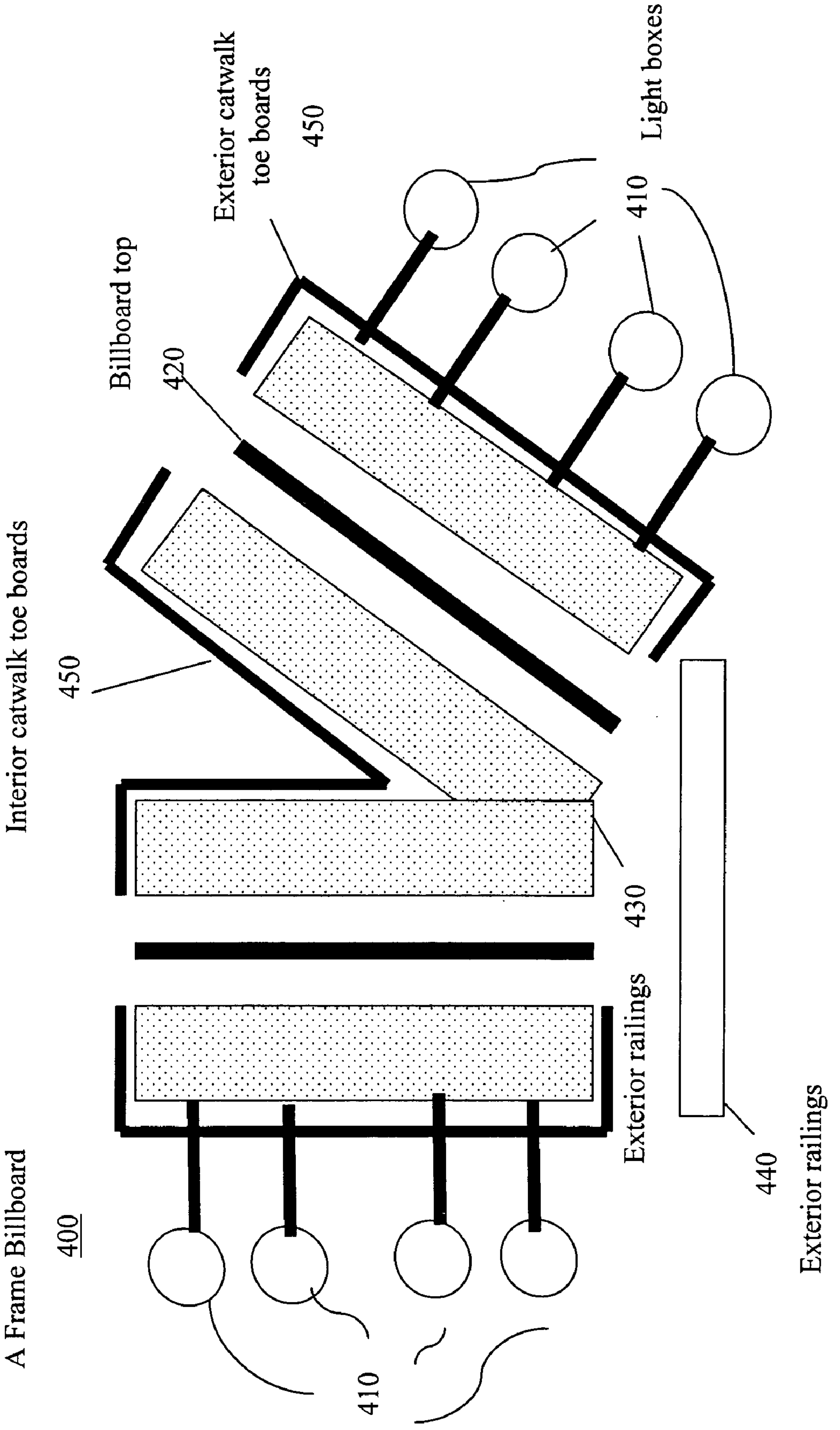
FIG. 4 is a top perspective view of a "V" frame billboard depicting the surfaces upon which a bird can perch.

Referring to FIG. 4, a "V" frame billboard 400 is depicted noting the various features and surfaces that a bird can perch and roost, and the complexity associated with installing bird deterrent devices. The top perspective view shows the billboard top 420 oriented in a "V" fashion so that the billboard is displayed on the front surfaces to the public. The interior catwalks 450 occupy the bulk of the inner portion between the two billboards. There is also an exterior catwalk toe board 460 on the other side of the billboard. There is also an exterior railing at one end of the frame. A plurality of light boxes 410 is positioned about the billboard to illuminate the billboard and allow greater visibility, especially at night. The light boxes 410 are coupled to the billboard by light box struts supports. Thus all these horizontal surfaces 420, 410, 460, 450, and 440 are all potential perch areas. A person installing a bird deterrent is typically working at an elevated location and exposed to the environment. The prior systems require intensive installation requirements in positioning the previous deterrent systems and splicing and coupling sectional pieces. The birds tend to roost at interior locations that provide shelter from the environment and a surface area that is amenable as a perch.

Figures 5A, 5B, 5C:
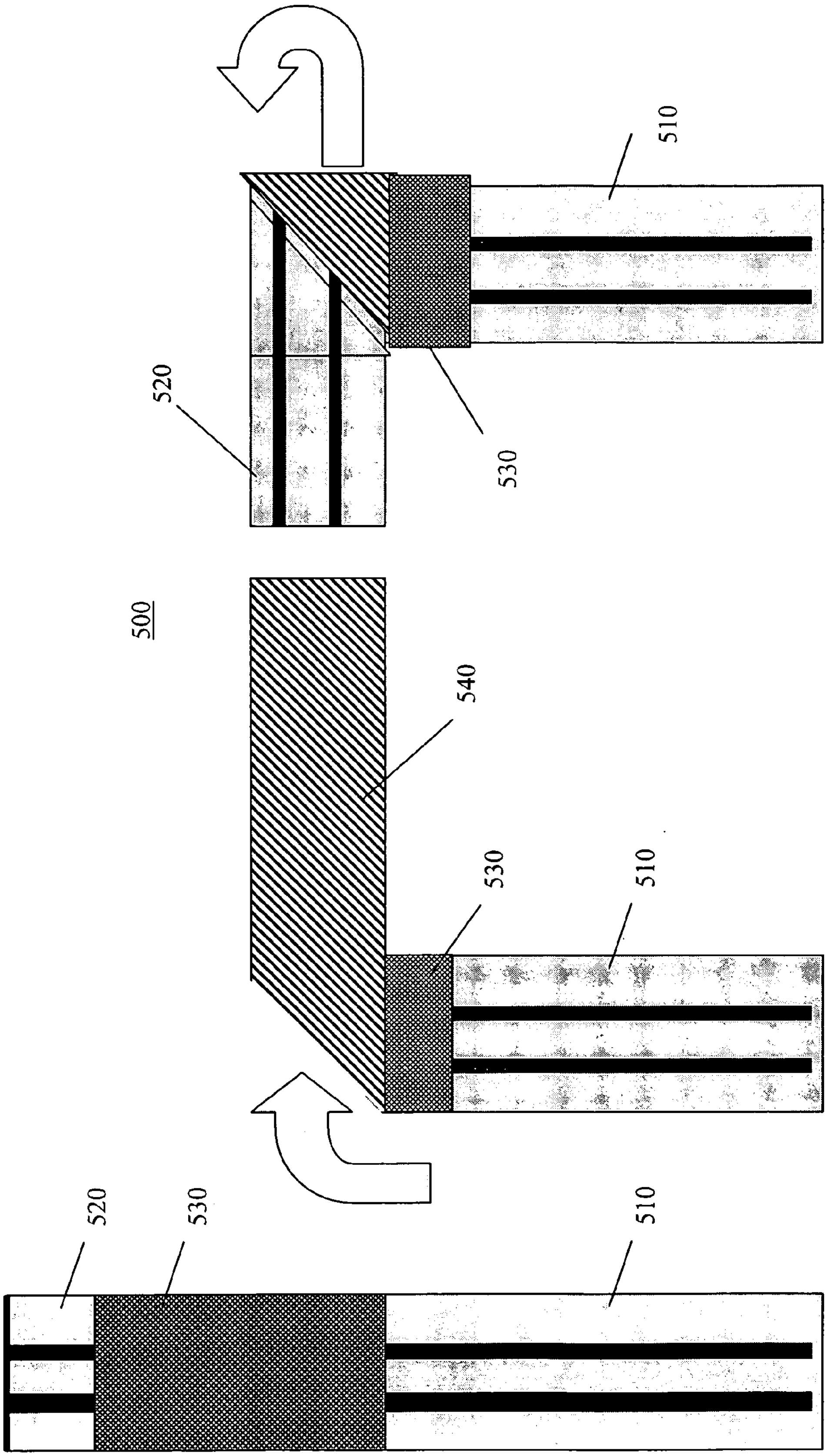
FIGS. 5*a,* 5*b,* and 5*c* show a technique for altering a direction of the shock tape in accordance with one embodiment of the invention.

As demonstrated, there are a variety of surfaces that require shock tape and the tape must be adaptable to many odd shaped structures. One embodiment for facilitating placement of the shock tape is the use of the 'flip-flop' as shown in FIGS. 5*a*, 5*b*, and 5*c*. Due to the flexible nature of the shock tape disclosed herein, the present invention is readily susceptible to making angular adjustments to the layout of the tape on a structure.

Employing terminology from rope tying, the 'standing part' 510 is the stationary portion of the tape and the 'bitter-end' 520 is the portion that is moved. In one embodiment there is a dielectric patch section 530 covering the conducting strips. The technique is essentially a 'flip-flop', wherein the bitter-end 520 of the tape is flipped over the standing part 510 such that the patch 530 is doubled up at the crossover point and the underside of the bitter-end 540 is shown. The bitter-end 520 is then flipped around and under the standing part 510 such that the conducting strips on the standing part 510 contact the underside contact two layers of the patch section 530. The conducting strips of the bitter-end 520 can then be angularly disposed in any direction ranging up to about 180 degrees relative to the standing portion 510 but typically is disposed approximately about 90 degrees relative to the standing portion 510. Sections of non-conductive material (not shown) may be disposed, if needed, between the surface of the structure and the conducting strips on the bitter-end 520. In this manner, the tape may be deployed in a single run without stopping or splicing thereby greatly facilitating placement and ease of installation without splicing and reducing problematic electrical connections. When bonding to non-conductive surfaces, insulating patches or strips are not necessary under a Flip-Flop corner.

Figure 6B:
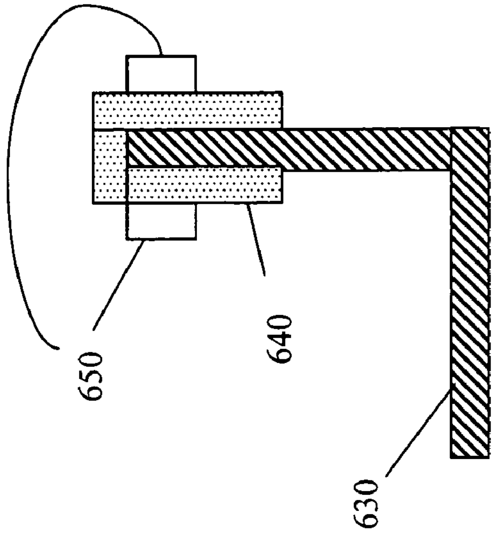
FIG. 6*b* shows the tape applied to a structure bending around the structure and configured in accordance with one embodiment of the invention.
Figure 6C:
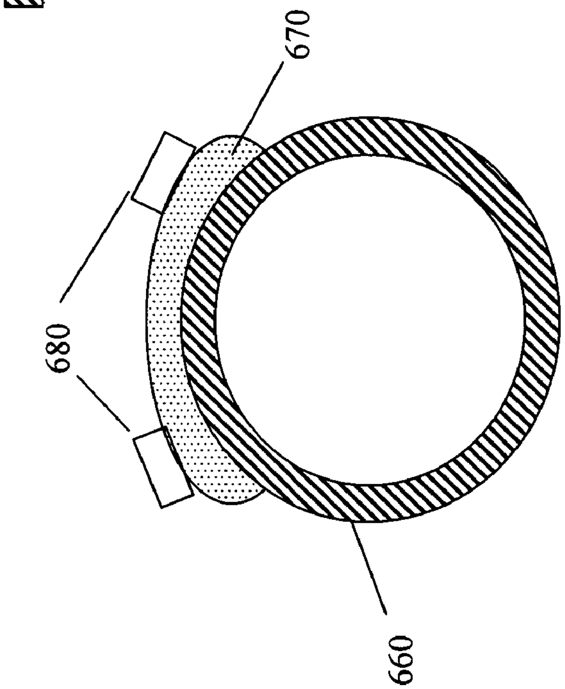
FIG. 6*c* shows the tape applied to a rounded structure and configured in accordance with one embodiment of the invention.
Figure 6A:
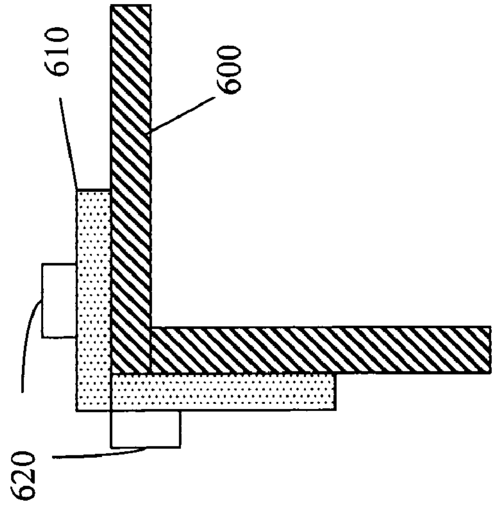
FIG. 6*a* shows the tape applied to an angled structure bending about 90 degrees and configured in accordance with one embodiment of the invention.

Referring to FIG. 6*a*-6*c*, the tape may be constructed in such a manner that it can be easily affixed to complicated structures due to the flexibility of the tape. FIG. 6*a* shows an angled structure 600 having the angled portion providing a perching location. The tape 610 is adhered along the angled portion such that is bends around the angle and the conductors 620 may be disposed about the angled structure 600 such that the conductors 620 are likely to be bridged by a resting bird, as the claws extend beyond the edge. The tape 610 can be manufactured with the conducting strips 620 in order to optimize the likelihood of providing a conducting path.

Referring to FIG. 6*b*, the tape 640 can also be constructed in a manner that when the bottom of the tape base 410 is bonded to a substrate such as metal angle with the top being flat 630, the conductors 650 are likely to be bridged by a resting bird as it claws will grasp the top edge and the claws will overhang about the edge. The conductors 650 may protrude slightly from the tape in order to increase the likelihood of making contact to both conductors by a bird.

Referring to FIG. 6*c*, the tape 670 can also be easily deployed on rounded structures 660 such the conducting strips 680 are oriented and placed for contact with the bird or animal that is to be shocked. As can be readily understood, the flexibility of the tape of the present invention facilitates installations and allows for the installation on structures previously considered too difficult to attempt. The ability to locate the conducting strips for a desired embodiment aids in optimizing a tape for shocking a pest.

Figure 7:
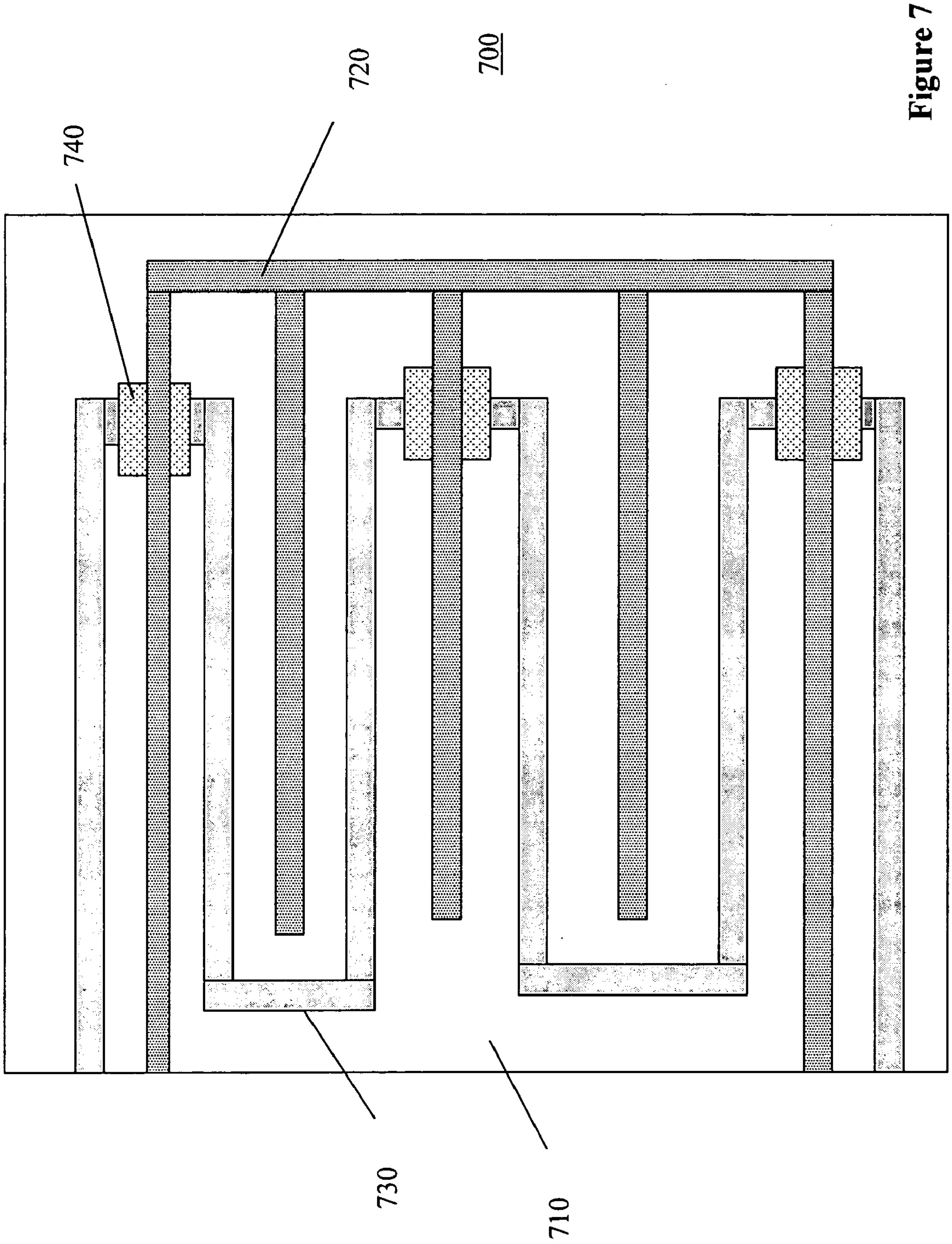
FIG. 7 illustrates a grid pattern on a poly sheet configured in accordance with one embodiment of the present invention.

A further embodiment of the invention is illustrated in FIG. 7 which disposes the conductive strips onto a thin flexible membrane to generate a shock pad 700. The pad 700 provides an efficient manner to easily secure the bird, animal or pest deterrent across a large surface area. One advantage of the pad 700 is to employ a grid or pattern of conductors having a certain length/width and affixing the pad to the mounting surface without having to run tape about the mounting surface. Thus, a single pad 700 can be deployed in a single operation. The pad 700 can come in standard sizes for the most common surface applications, it can be custom fabricated, or can even come in a kit form and be manufactured on-site. The on-site kit could have the conducting strips with a pressure sensitive adhesive and be quickly and easily affixed to the membrane according to the specific requirements.

For example, the pad 700 can be used with larger animals such as cats and dogs to teach these animals not to enter certain rooms or rest on certain areas. The mat can be deployed on a temporary basis during the workday to keep pets from resting on a sofa or from entering a restricted area.

The membrane 710 of the pad can be one of the synthetic rubbers such as neoprene that is weather resistant, cost-effective and has sufficient dielectric strength. The conducting strips or traces 720, 730 are placed in a pattern upon the membrane 710. The conducting strips 720, 730 can be wires, traces or flat wire having satisfactory electrical properties. The placement of electrical traces onto dielectric substrates is common for creating electrical circuit boards and the may be modified to accomplish the teachings set forth herein.

One or more HV high dielectric sections 740 such as rubber pieces that prevent arcing can be placed at the cross-over or in locations that may be more susceptible to arcing. These sections 740 can also be placed in positions to avoid arcing in relation to nearby metallic structures.

For illustrative purposes, one embodiment of a grid pattern can utilize 0.250 wide aluminum strips on a clear poly base. Another variation employs 22 gauge wire or equivalent flat wire. The conducting strips may have a pressure sensitive adhesive and easily be affixed to the membrane. Various patterns can be used to improve the likelihood of shocking a bird as well as possible aesthetic purposes.

The shock pads 700 can be disposed in the locations of large sign lettering such as used by department stores and represent the perch positions of the birds. The shock pads 700 can be standard sized widths for the most common channel letters, typically six and eight inches. One embodiment of the invention includes rolls of the shock film with the conductor elements forming a grid pattern suitable for the letters with the majority of the conductors on the outer portion of the film. The film can be cut into shock pads and affixed to the desired location and electrically coupled to the high voltage source.

The shock pads 700 can be relatively clear and would not detract from the aesthetics of the surface area. A hookup wire can be used to electrically couple the pads 700 to the power supply (not shown). Finally, a decorative power supply can be used to blend into the scene and avoid detracting from the advertisement.

Figure 8:
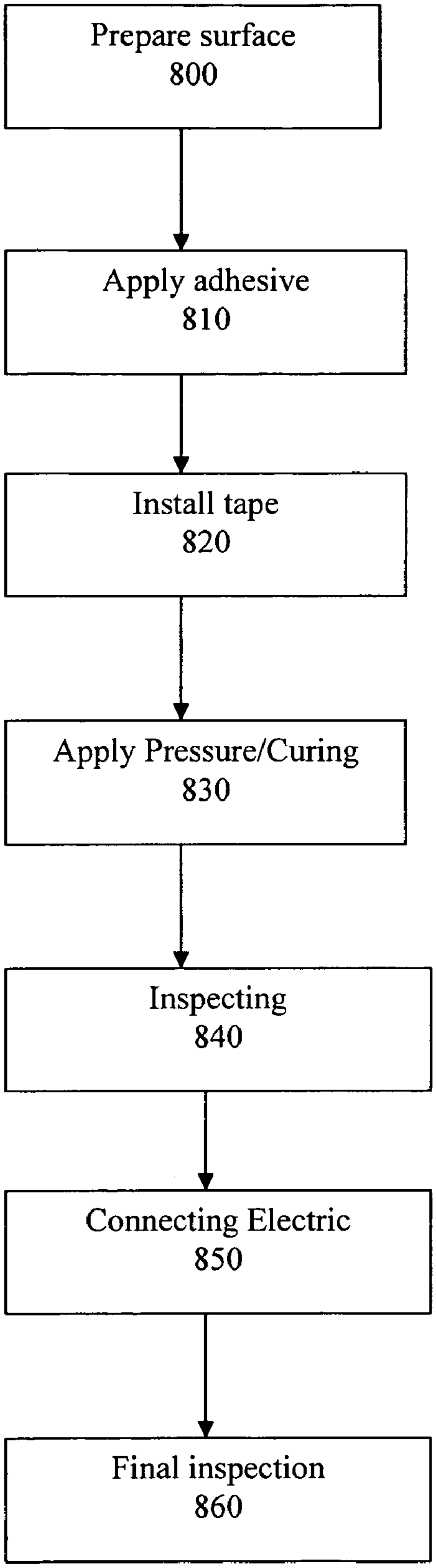
FIG. 8 is a flowchart showing steps in the installation of the tape according to one embodiment of the present invention.

Referring to FIG. 8, the installation process for the tape is depicted according to one embodiment of the invention. The installation of the electric shock tape, shock pads or shock film commences with standard industry preparation 800 namely cleaning the surface by removing debris and any loose paint chips or flaking matter. Due to the nature of the adhesives, the surface typically should be dry and the weather conditions should be amenable to satisfy the curing properties of the adhesive. Finally, the surface needs to be somewhat stable to ensure the shock tape, shock pads, and shock films have a long-lasting lifespan.

There are many adhesives in the industry for adhering the shock products to the desired surface 810, such as contact cements like 3M adhesive spray #80. Most urethane sealants provide a robust flexible bond with materials such as neoprene. The adhesive can be applied, for example, by applying dots every 1.5 inches along the surface to be covered by the tape. A ¼ inch dot generally wets out to about a ¾ inch mounting point.

The next step is to install the tape 820 along the adhesive trail. When satisfied with the location, firm pressure may be applied to enhance the bond 830, including the use of rags or rollers to apply diffuse pressure.

With respect to the curing process 830, the adhesion will generally reach full strength in 24-72 hours at temperatures above 40 degrees F. or as otherwise indicated by the sealant manufacturer. The urethane sealants should last for decades under harsh weather, and will bond to most surfaces.

If installing a pressure sensitive tape such that the adhesive is pre-existing on the tape, the substrate surface should be about 70 degrees Fahrenheit for optimal adhesion and the installers should peel several inches of liner of the tape from the bottom and press lightly into place and further pressure can be applied as indicated.

After installing the tape, some initial inspection 840 is generally performed to check for breaks in the conductors and otherwise ensure proper adhesion of the tape to the surface.

The high voltage unit is the connected to the tape 850. A final inspection is generally performed 860 to ensure the strips are charged and function with a proper shocking quality.

The power supply is typically coupled to the strips by high voltage connectors. In one embodiment, a plug such as double circuit polarized plugs is used so that a worker can unplug the power source. A safety disconnect is also sometime employed when the worker is required to perform tasks such as climbing an ascension ladder. The charging system in one embodiment is a capacitive discharge system which employs a controller unit that cycles pulses of electricity along the conducting strips using an output capacitor charged with DC current. The pulses from the capacitive discharge system have short pulse duration or 'on' time and an 'off' time separating each pulse. The off time is generally far greater than the on time. Another charging system is a continuous current system that provides a continuous AC supply. The continuous current systems operate at extremely low current, for example, for a 1000V system there might be only a 4.5 milliamp maximum current.

The power supply can have input from various sources. The most common voltage source is 110 VAC utility power sources that would be transformed for DC requirements. However, other power sources such as solar, wind and various battery types are within the scope of the invention. Some examples include solar rechargeable batteries and marine cell batteries. The input power consumption from units for most birds and small animals is generally about 3 to 4 watts. Output of the solid state controlled units is generally 2KV-10KV at low current. Because the voltage output is high, special insulated high voltage wires and connectors are generally used to avoid arcing through the insulation. One example of the high voltage wire is an Aluminum solid strand 20 gauge wire encased in a PVC insulation jacket rated at 15KV, wherein the wire is light gray, zip cord style construction, ⅛"×¼". The connectors can be any of a variety of high voltage connectors such as 3M® Scotchlok UAL connectors which are specifically intended for connecting 2-3 hookup wires and have gel filled and water resistant polycarbonate housings. The insulation material choices such as silicone, Teflon and cross-linked polyethylene prevent high voltage problems.

In one embodiment the present system is designed for D/C (direct current) capacitance chargers. Brief D/C static level charge pulses once per second. Duration of the pulse is less than 500 millionths of a second. Very low amperage output can be driven at 3K-10K volts. As known in the industry, the impedance of hides, hoofs, talons and related animal surfaces is about 500 ohms and requires, in some instances, about 700V to penetrate the surface and apply some form of shock. The voltage and power requirements vary depending upon the particular applications.

Figures 9A, 9B:
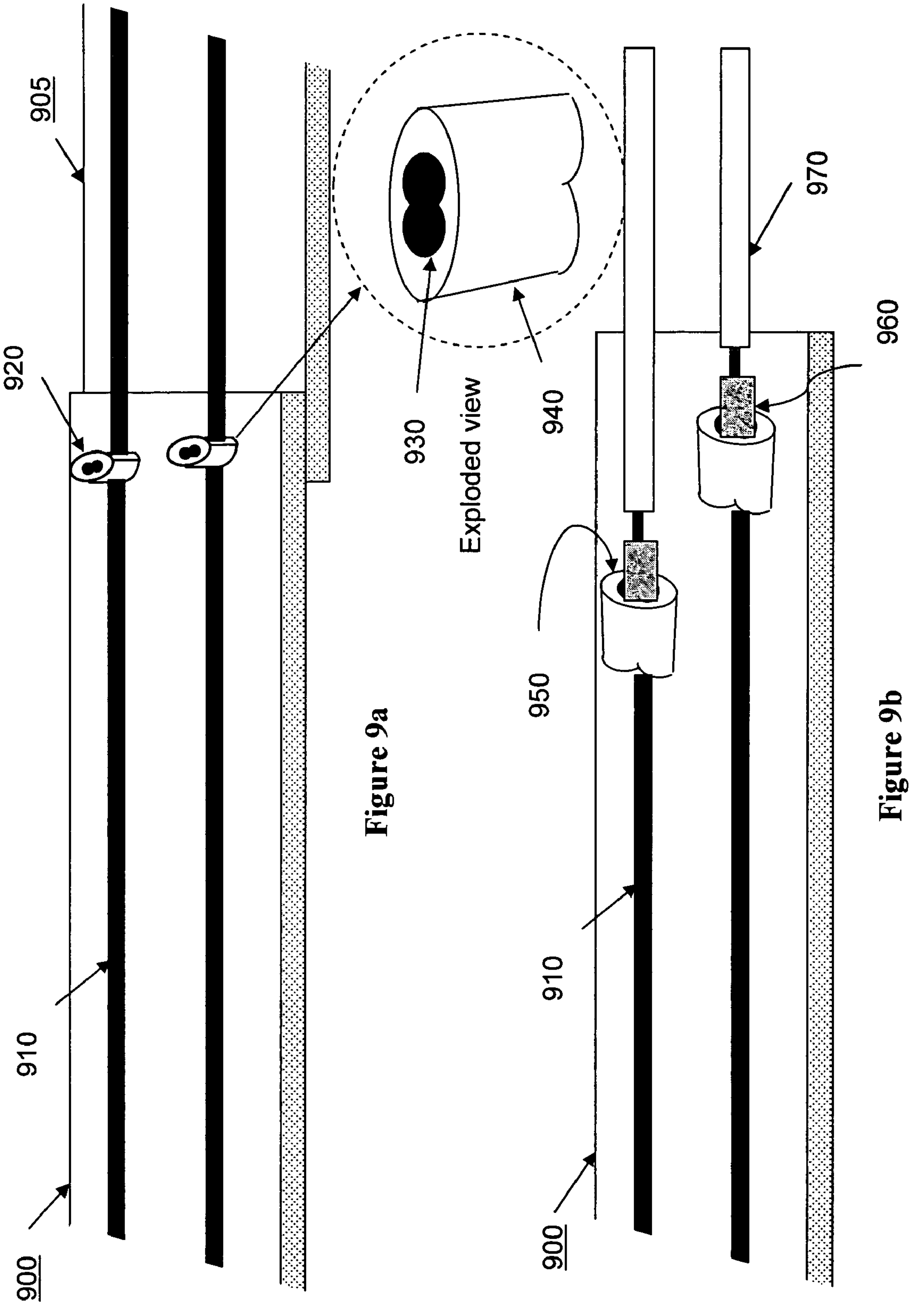
FIG. 9*a* is a side view perspective illustrating the electrical connectivity between two tapes configured in accordance with one embodiment of the present invention.
FIG. 9*b* is a side view perspective illustrating the electrical connectivity between the tape and electrical wires configured in accordance with one embodiment of the present invention.

One embodiment for electrically coupling the strips is to use a ferrule as illustrated in FIG. 9*a* and FIG. 9*b*. One embodiment for coupling between two strips, as shown in FIG. 9*a,* is to pull up a small section of the conducting strip 910 from two adjacent tapes 900, 905 and place the small sections of the conducting strips 910 within the ferrule 920. Once the ferrule 920 is crimped, a rugged and simple electrical coupling is accomplished. It should be noted that the tapes 900, 905 can be different types, shapes and sizes and also be used to accommodate any angle for mating the two tapes 900, 905.

The ferrule 920 can be any pliable conducting material such as aluminum. In one embodiment the ferrule has an oval shaped housing 840 with an internal opening 930 such that the shape and opening are configured to accommodate the conducting strips 910. It should be understood that a ferrule is just one example of an electrical connector that is within the scope of the present invention. There are various electrical connectors such as crimps, barrels, and ferrules that can be used to electrically connect the conducting strips 910.

Referring to FIG. 9*b,* the ferrule can also be used to electrically couple to wires or other electrical interconnections. For example, an overlap or butt-end splice can be used to couple the conducting strips 910 and the electrical wires from the power source (not shown). The wires 970 may also be jumpers to other tapes 900 to provide the electrical connections. The wire 970 can be a bare wire such as single of multi-strand and inserted into the ferrule opening. Alternatively, the wire 970 can have any of the various other types of connectors 960 known in the art to more easily couple the conducting wire(s) of the wire/cable to the conducting strip 910.

According to one method of installation, the two conducting strip sections are inserted into a ferrule and the ferrule is crimped. In this aspect, no soldering or electrical paste is required to make a strong connection. It is noted that dissimilar metals may cause certain problems as is know in the art, so having the strips and ferrule of the same metal is a further feature.

One type of ferrule or crimp device for electrically coupling the strips on the tape and having satisfactory physical and electrical characteristics is a duplex Aluminum ferrule/crimp that provides sufficient physical and electrical characteristics. There are certain advantages to using similar metals for all coupling, so having aluminum traces and aluminum ferrules as described herein, however other conductive metals and coupling mechanisms are within the scope of the invention. For example, 'crimp-on' and 'splice' electrical couplings are known in the art and readily available for such low current/high voltage and outdoor environments. These crimp-on and splice devices may be used to electrically couple the individual electrical strips to each other and also couple the strips to the high voltage power lines. Stainless steel is another conductive metal that may be used although the conductive qualities are typically inferior.

As noted in FIG. 9*a,* overlap splicing takes two tapes that are placed end-to-end and slightly overlapping each other in order to have the conducting strips on a first tape contact the conducting strips of another tape. The conducting strip section from each tape is inserted into the ferrule and the ferrule is crimped to securely fasten and electrically couple the two tape sections. Additional sections of tape can be coupled in a similar manner and larger ferrules may be used so that multiple electrical connections to multiple tapes can be made.

Figures 10A, 10B, 10C, 10D:
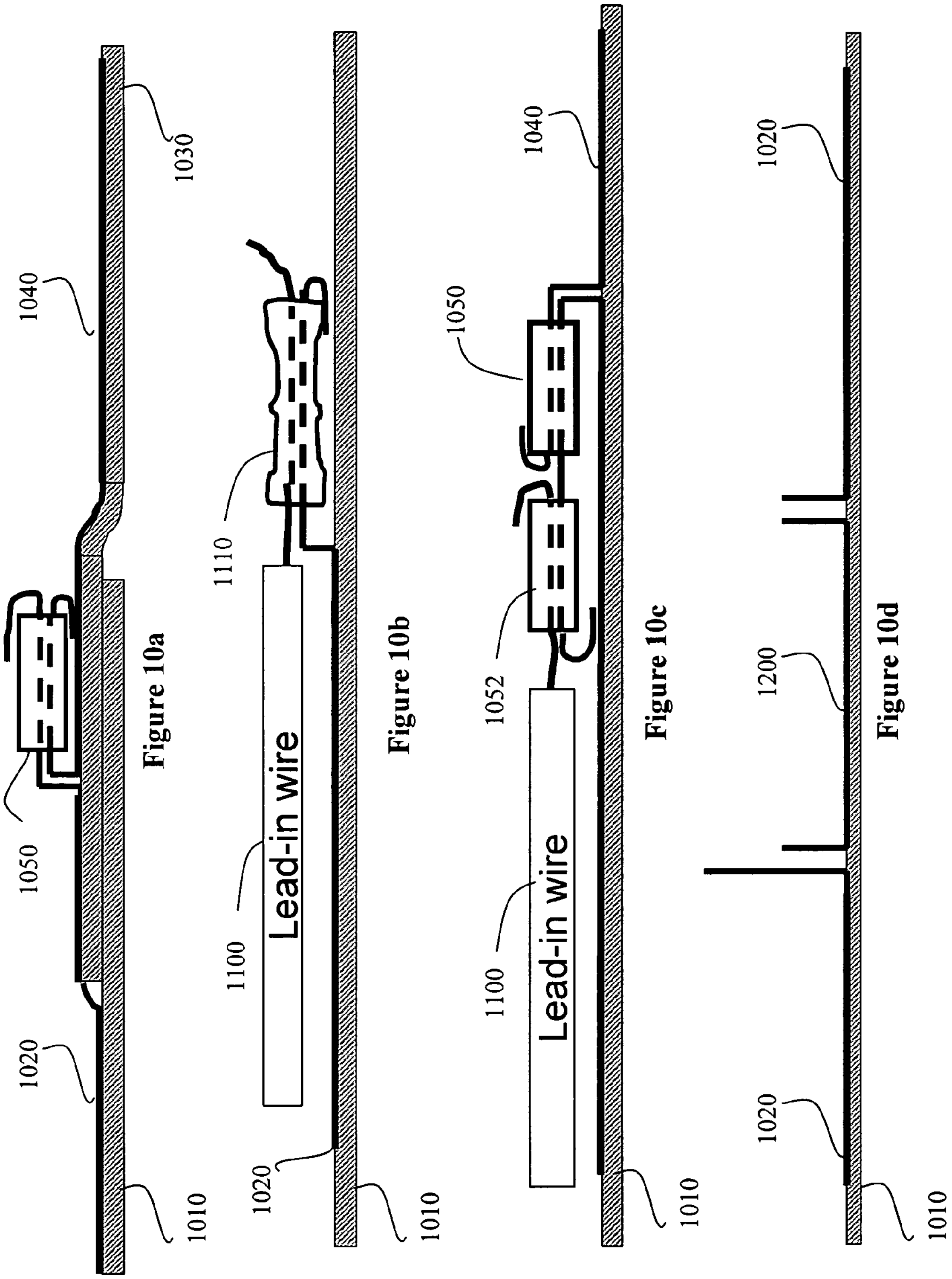
FIG. 10*a* is a side view perspective illustrating the electrical connectivity between overlapping tape sections and electrical wires configured in accordance with one embodiment of the present invention.
FIG. 10*b* is a side view perspective illustrating the electrical connectivity between a tape section and lead-in wires configured in accordance with one embodiment of the present invention.
FIG. 10*c* is a side view perspective illustrating the electrical connectivity between adjacent conducting strips sections and lead-in wires configured in accordance with one embodiment of the present invention.
FIG. 10*d* is a side view perspective illustrating Tee junctions on a continuous tape configured in accordance with one embodiment of the present invention.

Certain electrical connections are depicted in FIG. 10*a*-10*d* wherein the present invention can be deployed in numerous electrical coupling schemes. Referring to FIG. 10*a,* two overlapping tape sections 1010, 1030 each having respective electrical strip 1020, 1040, wherein the tapes 1010, 1030 are overlapped and the conducting strips 1020, 1040 are placed within a coupler 1050 thereby establishing an electrical connection between the two tapes 1010, 1030. It should be understood that more than one lead-in wire can be electrically coupled within the ferrule.

FIG. 10*b,* a tape section 1010 is coupled to a lead-in wire 1100 wherein the strip 1020 is pulled back and an end is inserted into the ferrule along with the center conductor of the lead-in wire 1100. The crimped ferrule 1100 is generally crimped in the center portion and the end portions of the ferrule 1100 remain uncrimped.

FIG. 10*c* shows the electrical coupling between two conducting strips 1020, 1040 which are electrically coupled to one or more lead-in wires 1100 via multiple couplers 1050. In this manner a series connection of a run can be continued. In one embodiment two flat strips 1040, 1010 are coupled in a first connector 1050 with one of the strips longer than the other in order to be coupled to another connector 1052, wherein the second connector 1052 may include, for example, one to three lead wires 1100.

Referring to FIG. 10*d,* a Tee junction is depicted wherein a conducting strip 1020 is cut and then pulled back such that there is a long section of conducting strip and a shorter section of conducting strip disposed. A wire section 1200 is inserted such that the conducting strips 1020 can have two points for electrical couplers.

Other electrical connectivity schemes are within the scope of the present invention. A further depiction of splicing of the conducting strips uses wrapped wires coupled around pulled-up sections of the conducting strip and using a wrap that is placed around both the wire and the strip that can be crimped or otherwise fastened. A conductor can be included within the wrap to improve the connection. Another method is to remove the dielectric wire coating and wrap the bare wire to the conducting strip. The strip can be pulled away from the tape base or intermediate layer in order to wrap the wire around the strip. There can be securing anchors and crimps to keep the wire in place and prevent undue stress upon the wire. The wires can be connected to the power supply or couple to other strips or bird deterring sections.

In one embodiment, the invention is fabricated as a composite tape wherein the processing integrally fabricates the tape base and conducting strips as part of a unitary product.

Due to safety concerns, there are many instances where safety warnings and labels may be appropriate and which will not unfavorably detract from the aesthetics. The film and tape can be made with integral warnings throughout the product to ensure adequate notice is provided. Adhesive labels can be provided in conjunction with or in lieu of the integrated labeling so that the installer can place a notice in a location most suitable for the application. While the present invention allows for an 'invisible' tape or film, the products can be fabricated in a variety of colors and can include patterns such as stripes to easily identify the product in the field when suitable.

The tape is generally water repellent and water tends not to collect on the smooth surface. Also, water is not a good conductor of electricity. Therefore although some arcing can be anticipated in wet weather under certain conditions, testing has demonstrated that it is not problematic. Immersion testing of sections of the tape indicates that even when immersed in water the tape of the present invention can deliver a sufficient shock, depending upon the length of the section of tape and the charger. One variable is the voltage output of the DC static charger.

In some embodiments the tape may have a cross section perspective having a height differential across the width of the tape so that water flows off the tape. For example, one side of the tape can be higher than the other side thereby having the conducting strips at two different heights. Another height differential shock tape embodiment includes having a raised center section to prevent water from conducting across the conducting strips. There are a number of other possible embodiments for creating a height differential or creating a barrier across the width of the tape to assist in preventing water collection and arcing and all are within the scope of the invention.

In one embodiment the flexible base is a magnetic tape and can be affixed to any ferrous metal surface without additional adhesives. In other embodiments the tape base can be Ethylene Propylene Diene (EPDM) and any of the other synthetic rubbers. A further variation includes using VHB pressure sensitive adhesive tape such as provided by 3M®. The dielectric properties for of these transfer tapes and neoprene are generally satisfactory for the typical DC pulsing used by the energizers.

Mylar printed strips can provide cover sections, and in one embodiment of the lamination process, the Neoprene is run as the base material, on to which a full width application of a transfer film is fused by rollers wetting out the adhesive to the neoprene. The liner from the transfer film will be removed, exposing the top surface of adhesive. Two aluminum flat rolled wires will be guided to the exposed glue at a distance from each other. The aluminum will be rolled or pressed into the adhesive transfer film. Mylar or poly printed films without adhesive can be placed on the remaining exposed adhesive. The strips can be placed by guides and rollers to a position which is equidistant of both conductors. An exposed edge of the aluminum flat wire will aid the field installers in lifting the flat wire for inline splice connections and butt end splice connections by the visual break it offers. A Mylar strip can be applied to the exposed adhesive so that the Mylar is flush to the edge of the neoprene and is pressed into the adhesive.

The double sided pressure sensitive adhesives (with foam carrier) have excellent adhesion properties for both the conducting strips and the structure surface. The adhesive properties allow the user to 'pull back' the conducting strips for ease of splicing. The adherence to the structure may require special cold weather adhesives, heat application or a separate adhesive process may be required.

The conducting strips can be various conductive metals, including 22 gauge wire. One embodiment uses aluminum flat rolled wire, wherein the O temper is approximately 0.125" W×0.016 in one application and 0.250" width×0.018 in another application. The tape can use an aluminum wire to fit nicely into a highly compatible electrical system. When mated with aluminum crimps and aluminum hookup wire, galvanic corrosion is eliminated.

In another embodiment, splicing is accomplished by 'push-on' crimp style couplers that provide the electrical connectivity and securely affix to the two sections of the strips. Other embodiments include electrically conductive paste. As should be readily apparent, the present invention is not only superior to the metallic tracks, but it is also easier to use in the field. The ability to use ferrules and crimping tools instead of soldering irons and other electrically conductive pastes.

One embodiment of the present invention is directed to a system that will be electrified and repel birds from perching or nesting from billboard and other structures. A power supply or energizer generates a positive DC charge pulse of 2KV-10KV for about 300 microseconds at low amperage. The power supply will shut off for about one second between each pulse. The pulse duration is as brief as possible to deliver the shock in a harmless and safe manner to bird or animal. When both the positive and ground return terminals are connected to the shock tape, the pulse will be sent throughout the entire system. Electrical connections throughout are chosen so as to have little to no galvanic corrosion. Low resistance of the metal conductors and connectors on the device will ensure the voltage drop will be minimal and sufficient voltage will be at the end of the tape run to shock a bird or animal.

One of the benefits of this invention is the flexibility in the design and the ability to easily traverse the structure with the tape. In one embodiment the invention uses pressure sensitive adhesives to bind all components together. The base material can be a rubber, foam or plastic membrane flexible in all directions. The pressure sensitive adhesive distributes the stresses evenly and the invention will not delaminate when flexed. A further aspect of this invention is that the pressure sensitive adhesive can compensate for differential thermal expansion or contraction.

Another aspect of this invention is the use of pressure sensitive adhesive to secure the two electrical conductor strips. The adhesive aggressively holds the metal conductors securely against hundreds of pounds of sheer force. Yet the conductors are easily lifted from the adhesive to make electrical connections where required.

Yet a further aspect of this invention is providing a useable area on top of the invention that is not occupied by any electrical conductors. This area is an exposed adhesive area where printed materials can be applied. This feature allows the end users to choose a wide range of colors, patterns or translucent coverings in an economical fashion. The same coverings protect the adhesive surface from collecting debris. The same coverings can be used to caution others of electric shock potential and can be prepared for any language. The tops of the tapes can come in many colors and designs and be UV resistant thereby ensuring the label and colors will look the same for many years.

An embodiment of the present invention provides a static shock delivery that will upset birds and employs a thin, flexible neoprene base that conforms to a huge array of shapes, and being so thin, there is practically no profile. The invention profile is about 1/32" high in one embodiment, which diminishes water damming and reduces the potential of a trip hazard associated with existing devices.

Another advantage of the present invention is the ability to combine the various embodiments of the shock tape to obtain the advantages of a particular tape in a particular area. For example, the use of the transparent shock tape in highly visible areas may be advantageous whereas other area may prefer the visible tape. Another feature of the invention is to provide a device and system which is able to easily conform to the objects that make up the structure, such as a billboard, that are not easily managed by existing electric track systems. In addition, the present invention maintains a low profile that does not represent a trip hazard.

One feature of the invention is to maintain a low profile tape. Another feature is to provide a shape and construction that easily and economically meets stringent requirements for color and pattern matching, cosmetic transparent tape and labeling. It is yet another feature to provide a simple means to connect the electrical system with simple connections and tools as compared to prior systems.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A tape for deterring birds and animals, comprising:

a flexible elongate substantially planar base material having a top surface and a bottom surface;

an intermediary layer securely disposed on said top surface of said base material;

at least two solid metal conducting strips securely disposed on said intermediary layer by an adhesive, wherein said strips are separated by a gap to avoid arcing between said strips, and wherein each of said conducting strips has a side margin to avoid arcing between said conducting strips and a structure upon which said tape is installed;

a film material disposed on said intermediary layer about said conducting strips such that said conducting strips are not covered by said film material;

wherein said base material in combination with said intermediary layer, has a dielectric property sufficient to insulate said conducting strips from a structure upon which said tape is installed; and wherein said tape is a thin composite laminate.

2. The tape of claim 1, wherein said film material is between said conducting strips and has characteristics selected from at least one of the group consisting of colored, clear, shaded, patterns, and textual messages.

3. The tape of claim 1, wherein said base material has characteristics selected from at least one of the group consisting of colored, transparent, translucent and clear.

4. The tape of claim 1, wherein said film material is selected from the group consisting of acrylic, polyolefin, polyester and compositions thereof.

5. The tape of claim 1, wherein each said side margin is at least about 0.5 inches.

6. The tape of claim 1, further wherein said strips are operatively coupled to a high voltage source.

7. The tape of claim 6, wherein the number of said strips is at least three, and said strips are disposed and coupled to said high voltage source such that any two of said strips can cause an electrical shock.

8. The tape of claim 1, wherein said strips are coupled to said high voltage source through wires, said strips and said wires being spliced and secured with an electrical connector.

9. The tape of claim 1, wherein said conducting strips are disposed on said intermediary layer in a pattern so as to increase the total surface area covered by said strips, thereby increasing the likelihood of said strips being bridged by animals intended to be shocked.

10. The tape of claim 1, wherein said film material is disposed between said conducting strips in a manner designed to avoid arcing between said conducting strips.

11. The tape of claim 1, wherein said gap between said conducting strips is not less than about 0.50 inches.

12. The tape of claim 1, wherein said base material is selected from at least one of the group consisting of single sided adhesive coated, and double sided adhesive coated.

13. A system for deterring birds and animals, comprising:

a substantially planar flexible pad of a dielectric material;

a pair of solid metal conductive strips disposed in a pattern upon a surface of said pad by an adhesive, wherein said pair of strips overlap each other but are electrically isolated from each other by high dielectric sections situated approximately between said overlapping pair of strips; and a high voltage source operatively coupled to said conductive strips.

14. The system of claim 13, wherein said pad is a removable mat.

15. The tape of claim 1, wherein said tape has a relatively thin profile and is about approximately 1/32 inch high.

16. The tape of claim 1, further comprising a first adhesive layer between said intermediary layer and said base material and a second adhesive layer disposed on at least a portion of said intermediary layer, wherein said conducting strips and said film are disposed on said second adhesive layer.

17. The tape of claim 16, wherein said film is a center film disposed on said second adhesive layer between said conducting strips.

18. A thin composite laminate tape for deterring birds and animals, comprising:

a flexible elongate substantially planar base material having a top surface and a bottom surface;

a first adhesive layer disposed on at least a portion of the top surface of the base material;

an intermediary layer securely disposed on said first adhesive layer;

at least two sections of adhesive disposed upon said intermediary layer;

at least two solid metal conducting strips securely disposed on said two sections, wherein said strips are separated by a gap to avoid arcing between said strips; and wherein said base material in combination with said first adhesive, said intermediary layer, said two sections of adhesive and said conducting strips form said composite laminate tape.

19. The tape of claim 18, wherein said tape has a relatively thin profile and is about approximately 1/32 inch high.

20. The tape of claim 18, wherein each of said conducting strips has a side margin to avoid arcing between said conducting strips and a structure upon which said tape is installed.

* * * * *